United States Patent

Pierce et al.

Patent Number: 5,725,076
Date of Patent: Mar. 10, 1998

[54] SPRING BRAKE ACTUATOR AND CAGING BOLT THEREFOR

[75] Inventors: William C. Pierce; Raymond D. Subdon, both of Muskegon, Mich.

[73] Assignee: NAI Anchorlok, Inc., Muskegon, Mich.

[21] Appl. No.: 743,801

[22] Filed: Nov. 5, 1996

Related U.S. Application Data

[63] Continuation of Ser. No. 36,677, Mar. 25, 1993, abandoned.

[51] Int. Cl.[6] .......................... F16D 65/24; F16B 39/22
[52] U.S. Cl. .......................... 188/170; 188/216; 92/63; 411/284; 411/937.2
[58] Field of Search .......................... 188/166, 170, 188/216; 29/456, 515, 517; 411/3, 5, 284, 937.2, 937; 92/63

[56] References Cited

U.S. PATENT DOCUMENTS

| | | | |
|---|---|---|---|
| 2,679,879 | 6/1954 | Engstrom | 411/284 |
| 3,391,721 | 7/1968 | Rosan | 411/937 X |
| 3,439,585 | 4/1969 | Herrera | 92/63 X |
| 3,842,716 | 10/1974 | Swander, Jr. | 92/63 |
| 4,469,015 | 9/1984 | Clark | 92/63 |
| 5,061,132 | 10/1991 | Cosenza | 411/937.2 X |
| 5,105,727 | 4/1992 | Bowyer | 92/63 |
| 5,228,817 | 7/1993 | Cosenza | 411/937.2 X |
| 5,231,752 | 8/1993 | Hereford | 29/517 X |

FOREIGN PATENT DOCUMENTS 0015252  of 1910   United Kingdom ............ 411/284

*Primary Examiner*—Peter M. Poon
*Attorney, Agent, or Firm*—Rader, Fishman, Grauer & McGarry

[57] ABSTRACT

A connector for a spring brake actuator comprises a threaded bolt having at least one flat portion on an outer surface thereof, a nut having a threaded central aperture threaded onto the bolt, and an embossment on the nut, extending inwardly of the central aperture to frictionally engage the flat portion of the bolt, so that the embossment prevents rotation of the nut with respect to the bolt. A method for fixedly attaching a nut onto a bolt comprises forming a flat portion on an outer surface of the bolt, threading the nut onto the bolt in alignment with the flat portion, and pressing inwardly of the nut with a punching tool to cause a portion of the material of the nut to extend inwardly of the central aperture forming an embossment in engagement with the flat portion on the bolt to hold the nut rigid with respect to the bolt.

17 Claims, 2 Drawing Sheets

5,725,076

SPRING BRAKE ACTUATOR AND CAGING BOLT THEREFOR

This is a continuation of application Ser. No. 08/036,677 filed Mar. 25, 1993, now abandoned.

BACKGROUND OF THE INVENTION

1. Field of the Invention

This invention relates to a spring brake actuator. More specifically, the invention relates to a spring brake actuator having a nut which is permanently mounted upon a bolt to form a bolt head, and a method for mounting the nut upon the bolt.

2. State of the Prior Art

An air brake system for a vehicle such as a bus, truck or the like typically includes a brake shoe and drum assembly which is actuated by means of an actuator assembly operated by the selective application of a fluid such as compressed air. Conventional air brake actuators have both a service brake actuator for actuating the brakes under normal driving conditions by the application of compressed air and an emergency or spring brake actuator which causes actuation of the brakes when air pressure has been released. The emergency brake actuator includes a strong compression spring which forces application of the brake when air is released. This is often referred to as the spring brake. Typically, the spring brake actuator is disposed in tandem with the service brake actuator.

When full pressure is applied to the spring brake actuator, air pressure acting against a diaphragm and a pressure plate compresses the spring. In many applications, a spring brake actuator rod is held in a retracted position by a relatively small return spring. In newer applications, the spring brake actuator rod is integral with the pressure plate and held in a retracted position by the air pressure. In both designs, the spring brake actuator rod thus does not affect the normal operation of the brake. Depressing the brake pedal during normal driving operation introduces compressed air into the service brake actuator which, acting against a diaphragm, causes a service brake push rod to be extended and the brakes to be applied with an application force proportional to the air pressure in the service brake actuator. In the event of a loss of air pressure or an intentional exhaustion of air from the spring brake actuator, the brake will be mechanically activated by the force of the strong compression spring acting on the spring brake actuator rod which, in turn, acts upon the service brake push rod to apply the brakes. Thus, the spring brake portion serves both as a parking brake and an emergency brake.

U.S. Pat. No. 5,105,727 to Bowyer, issued Apr. 21, 1992, discloses a known spring brake assembly which includes both a spring brake portion and a service brake portion. The service brake portion includes an air chamber partially defined by a flexible diaphragm acting against a service brake push rod and a return spring to assure proper release of the brake when air is exhausted from the air chamber. The spring brake portion also includes an air chamber comprising a spring brake housing and a spring brake actuating rod formed integral with a spring brake pressure plate and secured to the spring brake diaphragm. The spring brake diaphragm is provided with a centrally disposed aperture and engages the actuating rod and pressure plate to form an airtight seal. A strong power spring acts between an end of the spring brake housing and the pressure plate, and tends to urge the actuating rod out of the air chamber to engage the diaphragm and push rod of the service brake and to cause the brake to be applied. During normal operation, the spring force is counteracted by air pressure inside of the spring brake air chamber which acts against the diaphragm to compress the power spring, retracting the actuating rod. When system air pressure is lost, or manually released, the power spring extends to apply the brakes.

The actuating rod is hollow and provided with a central bore. The proximal end (nearest the spring brake housing) of the actuating rod is partially closed by an inwardly directed annular flange on a pressure plate. A brake releasing caging bolt extends into the central bore from outside of the spring brake housing and has an end plate for engaging the annular flange. The bolt is threaded and extends out of the actuating rod, through an aperture in the spring brake housing, through a threaded nut, and terminates in a bolt head. The nut is typically welded or staked to the exterior of the spring brake chamber. Application of torque to the bolt head causes the bolt to rotate through the nut bringing the reaction plate into engagement with the annular flange and thereby retracting the pressure plate and power spring. Because of the extreme stresses and torques applied to the bolt head and reaction plate, it is desirable to have both integrally formed with the bolt. However, the bolt must be assembled through the narrow aperture in the pressure plate at the annular flange so that either the reaction plate or bolt head must be installed onto the bolt after the bolt has been placed through the narrow aperture.

SUMMARY OF THE INVENTION

The present invention provides a connector for a spring brake actuator and method for installation whereby a nut is rigidly secured to the end of a bolt, thereby forming a bolt head which has the ability to withstand high torque loads.

A connector for a spring brake actuator according to the invention comprises, a threaded bolt having at least one flat portion on its outer surface and a nut having a threaded central aperture threaded onto the bolt. An embossment on the nut extends inwardly of the central aperture to engage the flat portion of the bolt. The embossment, thus prevents rotation of the nut with respect to the bolt.

Preferably, the embossment is formed by pushing a portion of the material of the nut from an outer side thereof through the nut. A tool having a flat face, can be pressed into the side of the nut to displace the material of the nut into the central aperture to form the embossment. Preferably, the bolt has at least three flat portions equally spaced about the circumference of the bolt and the nut has three embossments in contact with the flat portions.

A brake actuating mechanism according to the invention comprises a housing having first and second end walls with a threaded opening centrally disposed in the second end wall. An elastomeric diaphragm is suspended within the housing and divides its interior into a first chamber and a second chamber. The diaphragm has a centrally disposed aperture defined by an annular edge, which is substantially axially aligned with the opening. A tubular brake actuating rod disposed in the first chamber for reciprocating movement relative to the housing has a first end extending through the opening in the first end wall, and a second end extending through the aperture in the diaphragm. An inwardly directed annular flange is mounted on the second end of the actuating rod. A pressure plate is disposed within the second chamber and attached to the brake actuating rod, and a spring is disposed within the second chamber. A first end of the spring abuts the second end wall and a second end of the spring abuts the plate. A brake release bolt comprises a proximal end and a distal end. The bolt distal end extends into the actuating rod and has a shoulder adapted to seat on the inwardly directed annular flange on the actuating rod. The bolt proximal end threads onto the threaded opening in the second end wall of the housing and has at least one flat portion on an outer surface thereof. A nut, having a central aperture, threads onto the bolt, and an embossment on the nut extends inwardly of the central aperture to engage and abut the flat portion of the bolt. Thus, the embossment prevents rotation of the nut with respect to the bolt so that torque applied to the nut rotates the bolt in the threaded opening of the second end wall to move the bolt axially within the actuator rod, whereby the spring can be caged by rotating the nut to withdraw the distal end of the bolt from the housing.

A method for fixedly attaching a nut onto a bolt according to the invention comprises, forming at least one flat portion on an outer surface of a threaded bolt; and threading a nut, having a threaded central aperture adapted to coaxially receive the bolt, over the bolt so that the nut is aligned with the flat portion of the bolt. Pressing inwardly of the nut with a punching tool displaces the material of the nut inwardly into the aperture, forming an embossment on the nut which engages and abuts the flat portion of the bolt. The embossment prevents rotation of the nut with respect to the bolt.

Preferably, the nut is placed into an opening in a holding jig adapted to receive the nut prior to forming the embossments. The holding jig has a passageway from an outside surface thereof into the opening holding the nut and through which a punch is inserted to form the embossment.

Preferably, the nut has at least four equally sized faces about its circumference, and the punching tool has a face surface substantially smaller than the nut faces.

A method, according to the invention, for assembling a brake actuator having a housing, a hollow actuating rod with an inwardly directed annular flange on a first actuating rod end, and a caging bolt with an integrally formed shoulder adjacent a first bolt end, comprises the following steps. At least one flat portion is formed on an outer surface of the bolt adjacent a second bolt end. The second bolt end is inserted into an open second actuating rod end and moved out of the actuating rod through the first actuating rod end, leaving the bolt shoulder within the actuating rod. The caging bolt is threaded through a threaded aperture in the housing. A nut, having a threaded central aperture adapted to coaxially receive the bolt, is threaded over the bolt so that the nut is aligned with the flat portion of the bolt. The nut is pressed inwardly with a punching tool to displace material of the nut inwardly into the aperture, forming an embossment on the nut which engages and abuts the flat portion of the bolt to prevent rotation of the nut with respect to the bolt.

DETAILED DESCRIPTION OF THE DRAWINGS

Figure 1:
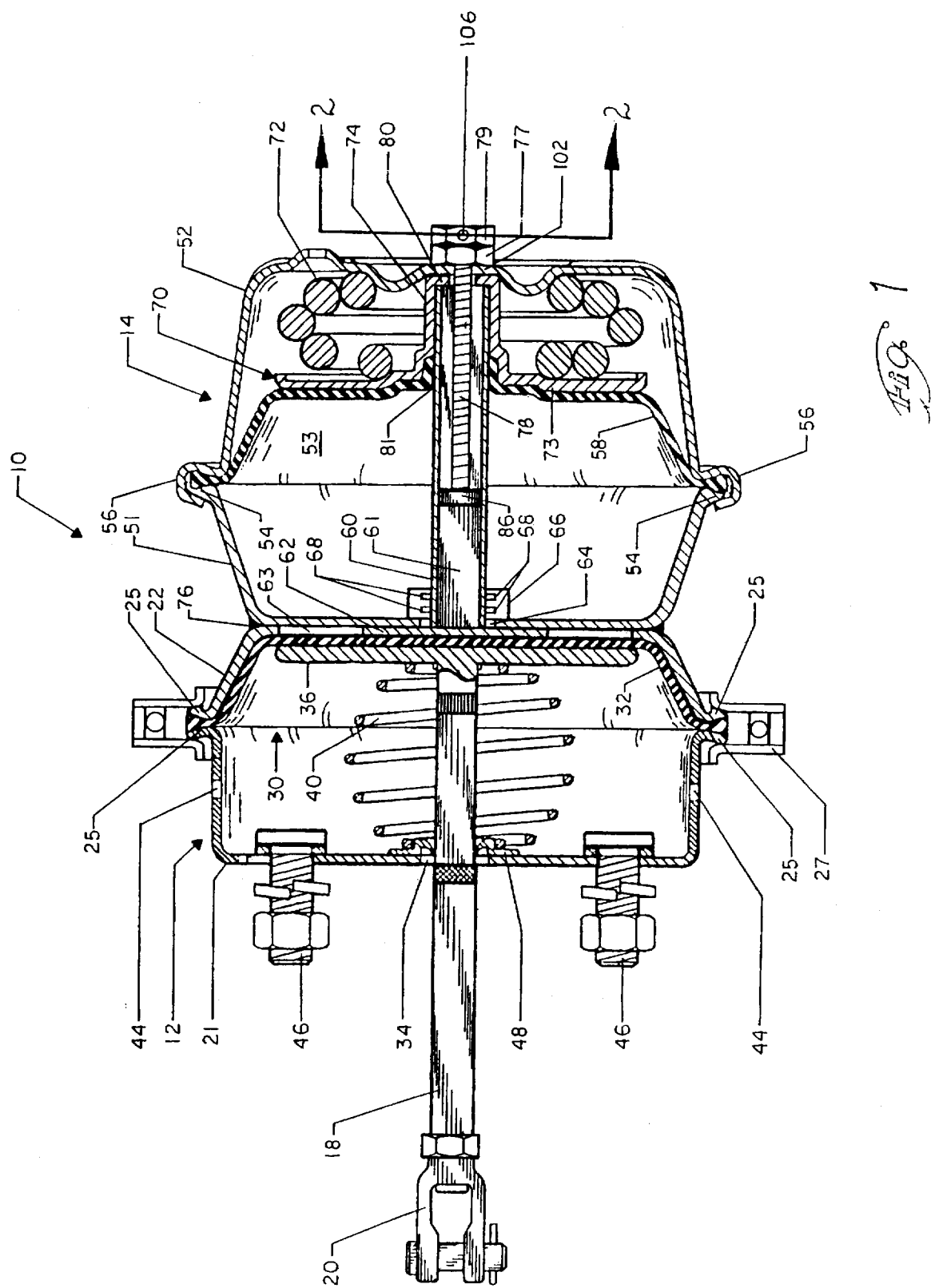
FIG. 1 is a cross-sectional view of an air-operated brake actuating assembly having a spring brake actuator arrangements in accordance with the principles of this invention.

Referring to the drawings and to FIG. 1 in particular, a cross-sectional view of an air-operated brake actuating unit 10 having a general configuration well known in the art is illustrated. The actuating unit 10 comprises a service brake portion 12 mounted in tandem to a spring brake or emergency brake portion 14. A service brake push rod 18 extends from the service brake 12 for reciprocating motion and is provided with a clevis 20 which is adapted to connect to a conventional brake system (not shown in the drawing) in a standard fashion. Reciprocating motion of the push rod 18 will cause the brake to be alternately applied and released.

The service brake 12 comprises a pair of facing cup-shaped housing sections 21 and 22, each having an outwardly directed flanged edge 25. The housing sections 21 and 22 are clamped together at their flanged edges by means of a clamp 27 to form a service brake inner chamber 30. An elastomeric diaphragm 32 is suspended within the inner chamber 30 and is compressed at the peripheral edge thereof between flanged edges 25 of the housing sections 21 and 22. The service brake push rod 18 extends through a central opening 34 in housing section 21 and into the service brake chamber 30 where it terminates in a pressure plate 36. A compression spring 40 extends between pressure plate 36 and the interior surface of the housing section 21. A spring seat 48 is disposed around the central opening 34 to receive the end of the compression spring 40 and retain it in position around the opening 34. The spring 40 thus urges the pressure plate 36 and the service brake push rod 18 to a fully retracted position as depicted in FIG. 1. To operate the service brake, compressed air is introduced through an air service port in housing section 22 (not shown in the drawing) to force the diaphragm 32 and pressure plate 36 against the force of spring 40 to actuate the push rod 18. Openings 44 are provided in the housing section 21 to allow for the rapid evacuation of air from the inner chamber 30. Mounting studs 46 are provided to mount the brake actuating unit 10 onto a brake bracket.

The spring brake 14 comprises a pair of facing cup-shaped housing sections 51 and 52 joined at their edges to form an inner chamber 53. Housing section 51 is provided with an outwardly directed circumferential flanged edge 54. The housing sections 51 and 52 are clamped together by means of a peripheral curved edge 56 on housing section 52 engaging edge 54 on housing section 51. An elastomeric diaphragm 58 is suspended within the spring brake chamber 53 and is compressed at its peripheral edge between the edges 54, 56 of housing sections 51 and 52. The portion of the chamber 53 between the diaphragm 58 and housing section 51 forms an air chamber which is filled with compressed air supplied through an air service port in housing section 51 (not shown in the drawing) when the emergency brake is in its normal released position. An actuator rod 60, aligned with push rod 18, has one end extending through a central opening 64 in an end wall of housing section 51. The one end of actuator rod 60 terminates in a reaction plate 62 disposed in an aligned central opening 63 in an end wall of housing section 22. Opening 64 is provided with a bearing 66 having annular recesses to accommodate a pair of O-ring seals 68. Bearing 66 forms a bearing surface and an airtight seal for actuator rod 60. The other end of actuator rod 60 extends through a centrally disposed aperture 81 in the diaphragm 58 and terminates in a pressure plate 70 which engages spring brake compression spring 72. The pressure plate 70 comprises a substantially flat portion 73 engaging one end of spring 72 and a tubular portion 74 extending generally axially along the axis of spring 72. The tubular portion 74 is press-fit onto an end portion of actuator rod 60 such that the pressure plate 70 and the rod 60 form an integral unit. The pressure plate 70 may be formed of cast aluminum.

During normal operation of the brake 10, the actuator rod 60 will be in the fully withdrawn position, as depicted in FIG. 1, by means of compressed air which is maintained in the portion of the chamber 53 defined by the diaphragm 58 and housing section 51. When the compressed air is exhausted, compression spring 72, one end of which engages the outer end wall of housing section 52, forces the pressure plate 70 and rod 60, integrally attached to the pressure plate, in the direction of the brake push rod 18 of the service brake 12. The housing section 22 of the service brake 12 and housing section 51 of the spring brake 14 may be steel shells attached to each other by means of a circumferentially extending weld bead 76 or other suitable attachment means or can be an integral aluminum casting. The force of spring 72 causes actuator rod 60 to be extended through the central opening 64 and causes the reaction plate 62 to apply a force to the diaphragm 32 and pressure plate 36 of the service brake 12. This action causes the service brake push rod 18 to be actuated and the brake to be applied. When the brake is to be released, compressed air is once again introduced in the space between housing section 51 and diaphragm 58. The force of the compressed air against diaphragm 58 causes pressure plate 70, rod 60 and spring 72 to be returned to the position depicted in FIG. 1.

The actuator rod 60 is a hollow tube or rod provided with a central bore 61 to accommodate a brake release or caging bolt 78. The bolt 78 is adapted to engage an end edge 80 of the tubular portion 74 of pressure plate 70 to maintain the spring 72 in a compressed position whenever such is desired. The bolt 78 may be used to manually release the spring brake or to ensure that the compression spring 72 will remain compressed when maintenance functions are performed on the brake assembly. The bolt 78 is threaded and engages a fixed threaded opening or nut such as nut 77 affixed by welding or staking to the end wall of housing section 52. A second nut or head 79 is fixedly attached to the threaded bolt such that the bolt may be rotated in nut 77 by a common wrench or the like.

The end edge 80 provides positive engagement with the walls of actuator rod 60 when the rod is actuated and further serves as an engagement surface for a shoulder or end plate 86 of the caging bolt 78. Plate 86 engages the edge 80 when the bolt 78 is withdrawn to retain the compression spring 72 in its compressed state. Otherwise, the bolt 78 extends into the central bore 61 of actuator rod 60 by a sufficient distance to allow the actuator rod 60 to extend to its full length of travel without engagement between the edge 80 and reaction plate 86.

Because of the high stresses on the reaction plate 86, it is preferable that the reaction plate be integrally formed with the bolt 78. However, to assemble the brake mechanism, the bolt 78 must be inserted through the narrow aperture at the annular edge 80. Thus, if the reaction plate 86 is integrally formed with the bolt 78, the bolt head 79 must be installed on the bolt 78 after the bolt 78 has been inserted through the aperture at the end edge 80. Common methods for fixedly attaching a nut to a bolt to form a bolt head, such as set screws, splines, or welding are either unable to handle the extreme torque applied to the bolt head 79, or too expensive to manufacture.

Figure 2:
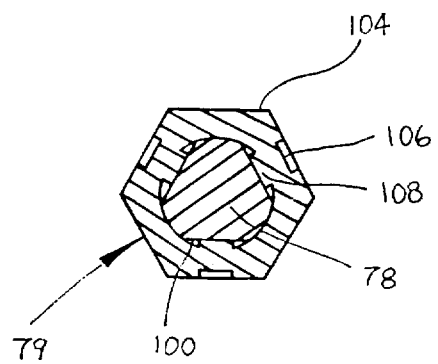
FIG. 2 is a sectional view of a nut mounted on a bolt according to the invention, taken along line 2—2 of FIG. 1.

Turning to FIG. 2, an inexpensive and simple, yet rugged, interconnection between the bolt head 79 and bolt 78 is illustrated. The end of the bolt 78 receiving the nut 79 has three flats 100 formed on its outer surface. Each of the flats 100 forms a chord across the circular cross-section of the bolt 78 and are equally spaced about the circumference of the bolt 78. During assembly, the bolt 78, having the reaction plate 86 integrally formed at one end thereof, is installed into the hollow actuator rod 60, so that the opposite end of the bolt 78 having the flats 100 projects outwardly of the actuator rod 60 past the end edges 80. The bolt 78 is then threaded through nut 77 which is welded or staked to the housing 52. Finally, the bolt head 79 is installed upon the end of the bolt 78.

The installation of the bolt head 79 proceeds as follows. First, a standard design high grade hexagonal nut 79 is threaded onto the bolt 78 over the section having the flats 100. The nut 79 has six side faces 104 for engagement by a common wrench or the like, three of the faces are aligned with the flats 100. Next, pockets 106 are punched into the three side engagement 104 aligning with the flats 100, thereby forming embossments 108 which will engage the flats 100 on the bolt 78. The nut 79 so attached, can withstand large torques without twisting or rotating on the bolt 78.

Figure 3:
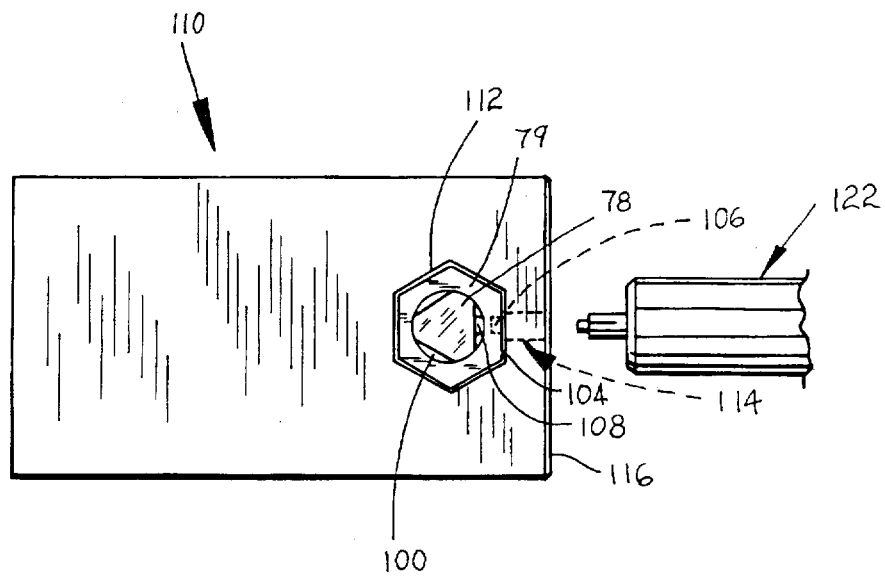
FIG. 3 is a plan view of a tooling jig and punch tool used to secure the nut of FIG. 2 to the bolt of FIG. 2.

Turning to FIG. 3, a tooling jig 110 for punching the pockets 106 in the nut 79 is illustrated. The jig 110 has a hexagonal opening 112 therethrough adapted to receive the hexagonal nut 79. A tool passageway 114 extends outwardly radially from the hexagonal opening 112 to an outside edge 116 of the jig 110 and provides access for a forming tool 122 to the side 104 of the nut 79.

Figure 4:
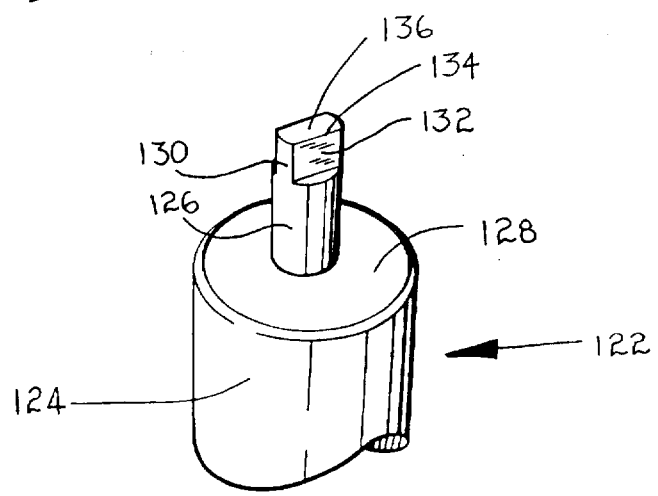
FIG. 4 is a detailed perspective view of the punch tool shown in FIG. 3.

Turning to FIG. 4, a detail of the forming tool 122 is illustrated. The forming tool 122 comprises a sturdy circular metal rod 124 narrowing abruptly to a reduced diameter portion 126, forming an annular flange 128 at the transition between the larger and smaller diameter portions 124, 126, respectively. The reduced diameter portion, or head, 126 has a punch 130 formed at its distal end. The punch 130 extends the full width of the head 126 however it has straight parallel opposing sides 132 to give it an essentially rectangular cross-section. The punch and tool head 126 are formed of hardened tool steel or other high hardness material and machined to form sharp cutting edges 134 at the transition between its distal face 136 and the parallel faces 132.

Returning to FIG. 3, operation of the tool 122 will be described. First, the bolt 78, having the un-punched nut 79 threaded on to its distal end so that faces 104 and flats 100 align, is inserted into the hexagonal opening 112 in the jig 110. The punch 130 on the tool 122 is then pushed through the tool passageway 114 to engage the face 104 of the nut 79, creating the pocket 106 and the embossment 108 to engage the flat 100 on the bolt 78. The bolt 78 and nut 79 are removed from the jig, and reinserted in proper position for the next face 104 to be punched by the tool 122. The process can then be repeated to form another pocket 106 or all three tools can operate simultaneously. Any standard means can be used for stroking the tool 122, such as a pneumatic or hydraulic cylinder (not shown).

Reasonable variations and modifications are possible within the scope of the foregoing disclosure without departing from the spirit of the invention as defined in the appended claims. For example, one or more pockets can be punched in the faces of the nut. Three pockets are preferred but less than three pockets can be used. Further, the nut can be square or hexagon in shape.

The embodiments of the invention in which an exclusive property or privilege is claimed are as follows:

1. A brake actuating mechanism comprising:
   a housing having first and second end walls defining a housing interior with a threaded opening centrally disposed in the second end wall;
   an elastomeric diaphragm suspended within the housing and dividing the housing interior into a first chamber and a second chamber, said diaphragm having a centrally disposed aperture defined by an annular edge, said aperture being substantially axially aligned with the opening;

a tubular brake actuating rod disposed in the first chamber for reciprocating movement relative to the housing and having a first end extending through the opening in the first end wall, a second end extending through the aperture in the diaphragm, and an inwardly directed annular flange partially closing the second end of the actuating rod;

a spring disposed within the second chamber between the second end wall and the diaphragm; and a brake release bolt comprising:
a proximal end and a distal end;
the distal end extending into the actuating rod and having a shoulder adapted to seat on the inwardly directed annular flange of the actuating rod;
the proximal end threaded through the threaded opening in the second end wall of the housing and having at least one flat forming a chord across a circular cross section of the bolt;
a nut having side engagement faces resistant to torque, a central aperture threaded onto the bolt and an embossment formed on the nut only after the nut is threaded onto the bolt in a final position, the side engagement faces remaining resistant to torque after formation of the embossment, the embossment extending inwardly of the central aperture of the nut to a point within the radius of the outer diameter of the bolt on the side of the bolt facing the flat of the bolt;
whereby the embossment prevent rotation of the nut with respect to the bolt so that torque applied to the side engagement faces of the nut rotates the bolt in the threaded opening of the second end wall to move the bolt axially within the actuating rod, whereby the spring can be caged by rotating the nut to withdraw the distal end of the bolt from the housing.

2. A brake actuating mechanism according to claim 1, wherein the bolt has at least three flats equally spaced about the circumference of the bolt and there are three embossments on the nut in engagement with the respective three flats.

3. A method for assembling a brake actuator having a housing with a threaded opening, a hollow actuating rod having first and second ends with an inwardly directed annular flange at the first actuating rod end, and a threaded caging bolt having first and second ends with an integrally formed shoulder adjacent the first bolt end, the method comprising:

inserting the second bolt end into the second actuating rod end, and moving the second bolt end out of the actuating rod through the first actuating rod end, leaving the bolt shoulder within the actuating rod;

threading the caging bolt through the threaded aperture in the housing;

threading a nut, having side engagement faces resistant to torque and a threaded central aperture adapted to coaxially receive the bolt, onto the second bolt end to a predetermined final position; and then pressing radially inwardly on the nut with a punching tool to displace the material of the nut radially inwardly into the aperture only after the nut is threaded onto the bolt to its predetermined final position to form an embossment on the nut in locking engagement with the bolt without further threading the nut onto the bolt, the side engagement faces remaining resistant to torque after formation of the embossment;

whereby the embossment prevents rotation of the nut with respect to the bolt.

4. A method for assembling a brake actuator according to claim 3, and further comprising the steps of forming at least three flats on the bolt at the bolt second end which are equally spaced about a circumference of the bolt, and forming at least three embossments on the nut, each of the embossments abutting a separate one of the at least three flats.

5. A method for assembling a brake actuator according to claim 3 and further comprising the steps of forming a flat with a chordal segment across a circular cross section of the bolt adjacent the second bolt end opposite the first bolt end, and aligning one of the engagement faces of the nut with the flat prior to forming the embossment.

6. A bolt and fixed nut assembly comprising:
a threaded bolt having a plurality of flats, the flats being circumferentially spaced around the bolt;
a nut having side engagement faces resistant to torque and a threaded central aperture threaded onto the bolt; and
a plurality of embossments formed on the nut only after threading the nut onto the bolt in a final position, the number of embossments corresponding to the number of flats on the bolt and being circumferentially spaced around the nut in alignment with the flats, each embossment extending inwardly of the central aperture and into direct engagement with the aligned flat, the side engagement faces remaining resistant to torque after formation of the embossments;
whereby the embossments prevent rotation of the nut with respect to the bolt.

7. A bolt and fixed nut assembly according to claim 6, wherein each embossment is formed by a portion of the material of the nut displaced radially inwardly into the central aperture of the nut.

8. A bolt and fixed nut assembly according to claim 6, wherein the bolt has at least three flats equally spaced about the circumference of the bolt and the nut has three embossments in engagement with the respective three flats of the bolt.

9. A bolt and fixed nut assembly according to claim 6 wherein at least one of the side engagement faces on the nut is in alignment with one of the flats and corresponding aligned embossment.

10. A method for fixedly attaching a nut onto a threaded bolt comprising:
first, threading a nut, having side engagement faces resistant to torque and a threaded central aperture adapted to coaxially receive the bolt, over the bolt to a predetermined final position on the bolt; and
then, pressing radially inwardly of the nut with a punching tool to displace the material of the nut radially inwardly into the aperture only after the nut is threaded onto the bolt to its predetermined final position, to form an embossment on the nut in locking engagement with the bolt without further threading the nut onto the bolt, the side engagement faces remaining resistant to torque after formation of the embossment;
whereby the embossment prevents rotation of the nut with respect to the bolt and thereby locks the nut to the bolt at the predetermined final position.

11. A method for fixedly attaching a nut onto a bolt according to claim 10 and further comprising the steps of forming a flat with a chordal segment across a circular cross section of the bolt, and forming the embossment in abutting relationship with the flat.

12. A method for fixedly attaching a nut onto a bolt according to claim 11, wherein at least three flats are formed on the bolt and are equally spaced about a circumference of the bolt, and three embossments are formed on the nut, each of the three embossments being in contact with one of the at least three flats.

13. A method for fixedly attaching a nut onto a bolt according to claim 11 and further comprising placing the nut into an opening in a holding jig adapted to receive the nut prior to forming the embossments, the holding jig having a passageway from an outside surface thereof into the opening holding the nut, and forcing a punch on the punching tool through the passageway into the nut to form the embossment.

14. A method for fixedly attaching a nut onto a bolt according to claim 11, wherein the nut has at least four equally sized side engagement faces about its circumference, and the punching tool has a cutting surface substantially smaller than the engagement faces.

15. A method for fixedly attaching a nut onto a bolt according to claim 11 wherein the bolt has first and second ends, and further comprising the steps of integrally forming a head on the bolt at the first end, and forming the flat at the second end, whereby the nut forms a second head at the second bolt end.

16. A method for fixedly attaching a nut onto a bolt according to claim 11 and further comprising the step of aligning one of the side engagement faces of the nut with the flat prior to forming the embossment.

17. A method for fixedly attaching a nut onto a bolt according to claim 10, further comprising the step of forming a flat with a chordal segment across a circular cross section of the bolt, then threading the nut onto the bolt over the flat and locating the embossment adjacent to the flat.

* * * * *